United States Patent [19]

Johnson

[11] 4,292,637
[45] Sep. 29, 1981

[54] INTERROGATING RADAR FOR USE WITH TAGGED TARGETS

[75] Inventor: Henry C. Johnson, Hillsborough Township, Somerset County, N.J.

[73] Assignee: RCA Corporation, New York, N.Y.

[21] Appl. No.: 105,110

[22] Filed: Dec. 19, 1979

[51] Int. Cl.³ ............................................. G01S 13/78
[52] U.S. Cl. ................................. 343/6.5 SS; 343/9 R
[58] Field of Search ...................... 343/6.5 SS, 9 R, 14

[56] References Cited

U.S. PATENT DOCUMENTS

| | | | |
|---|---|---|---|
| 3,172,102 | 3/1965 | Chapman | 343/6.5 SS |
| 3,713,149 | 1/1973 | Bruner et al. | 343/9 R X |
| 4,003,049 | 1/1977 | Sterzer | 343/6.5 R X |
| 4,023,167 | 5/1977 | Wahlstrom | 343/6.5 SS |
| 4,123,754 | 10/1978 | Armstrong | 343/6.5 SS |
| 4,146,890 | 3/1979 | Klensch | 343/14 X |
| 4,209,783 | 6/1980 | Ohyama et al. | 343/6.5 SS X |

Primary Examiner—T. H. Tubbesing

Attorney, Agent, or Firm—Samuel Cohen; Robert L. Troike; Raymond E. Smiley

[57] ABSTRACT

An interrogating station includes apparatus for transmitting a frequency modulated signal having a relatively low modulation rate to a plurality of uniquely tagged targets and for receiving therefrom a further modulated reply signal at a relatively high modulation rate, a mixer for mixing the transmitted and reply signals, to produce range modified tag modulation frequencies for all tagged targets, a voltage controlled filter for selectively passing the mixer output signal corresponding to any one of the tagged targets and a sweep and hold circuit for providing the frequency selecting voltage to the filter. The frequency selecting voltage is caused to change when no signal is passed by the filter and is fixed at the voltage corresponding to the signal frequency when a signal is passed by the filter. The magnitude of the frequency selecting voltage when fixed is used to determine the identity of the tag and the signal passed by the filter is further processed to determine range and/or range rate of the associated target.

7 Claims, 3 Drawing Figures

INTERROGATING RADAR FOR USE WITH TAGGED TARGETS

The present invention relates to identification radar and more particularly to radar for measuring the range and/or range rate of an identified target.

It is sometimes desirable to determine the range or range rate of a particular target when a number of targets are present in the same general area as the particular target. If the targets are separated by a sufficient distance selectively may be achieved by utilizing a suitable radar interrogating station with a very narrow beam transmitting antenna and/or receiving antenna which is directed toward the particular target. The direction of the interrogating antenna may be sufficient basis for identification or the target may be modified to include a tag that is uniquely identified by a time-based binary code that is impressed on the received signal before retransmission back to the interrogating station. In some situations, due to the relative position of the targets, it is not possible to select a particular target on the basis of beam selectivity alone. It is also difficult to separate the binary codes simultaneously received from multiple tagged targets.

In accordance with a system embodying the invention, each of the various targets is tagged wth an electronic identifying tag having a unique identification based on a frequency rather than a binary code. The tags are responsive to a modulated signal from an interrogating station which, in turn, is responsive to the modified and reradiated return signal from the electronic tag. The return signals have a characteristic indicia which varies from target to target. The interrogating station includes means for generating the modulated interrogation signals and for generating a sample of that signal and means responsive to the sample signal and the return signal from the targets for generating difference signals having distinguishable components indicative of return signals from various ones of the targets. The interrogating station also includes means for providing a control signal having a selectable value, means responsive to the difference signal and the control signal for passing only the difference signal associated with one given target determined by the value of the control signal and means responsive to the passed difference signals for generating a signal indicative of at least one of range and range rate of a selected target relative to the interrogation station.

Figure 1:
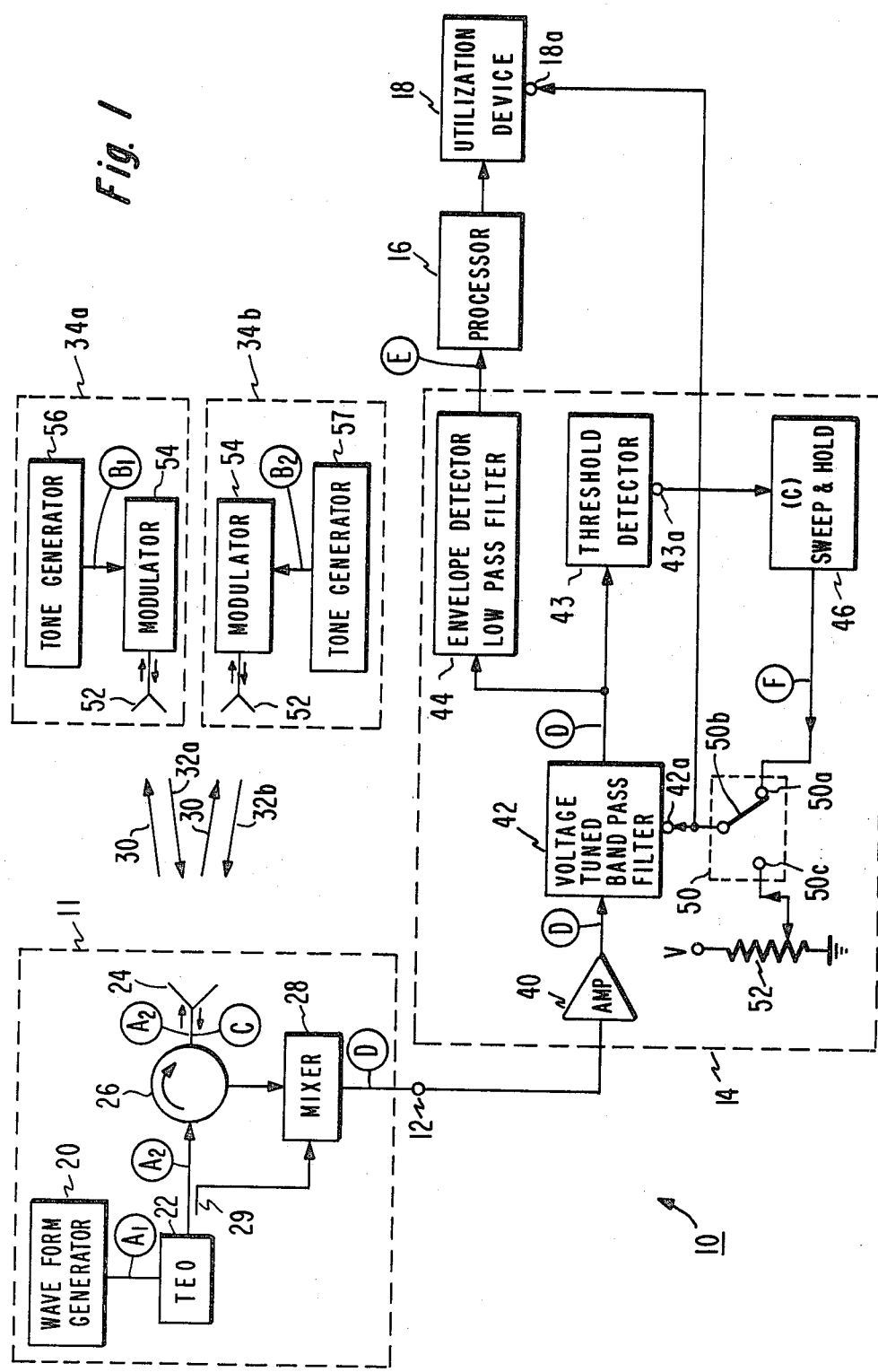
FIG. 1 is a block diagram of an interrogating station and two targets in accordance with a system embodying the present invention.

In FIG. 1 an interrogating station 10 comprises a frequency modulated continuous-wave (FM-CW) radar 11 of conventional design, with an output terminal 12, a target discriminator 14, a suitable processor 16 which provides information and control signals to suitable utilization means 18.

FM-CW radar 11 typically comprises conventional components such as a waveform generator 20, a transferred electron oscillator, (TEO) 22, an antenna network 24, a directional circulator 26 (coupling direction indicated by arrow), and a mixer 28. Waveform generator 20 is connected to TEO 22 the output signal of which is applied to antenna network 24 by a circulator 26. In addition, a small portion of the TEO 22 output signal is applied to mixer 28 by a directional coupler 29.

Antenna network 24 is preferably a printed circuit corporate feed antenna of the type described in U.S. Pat. No. 3,587,110 which is directional in nature. Antenna network 24 is arranged to transmit the TEO output signal as a radar interrogation signal 30.

Figure 2:
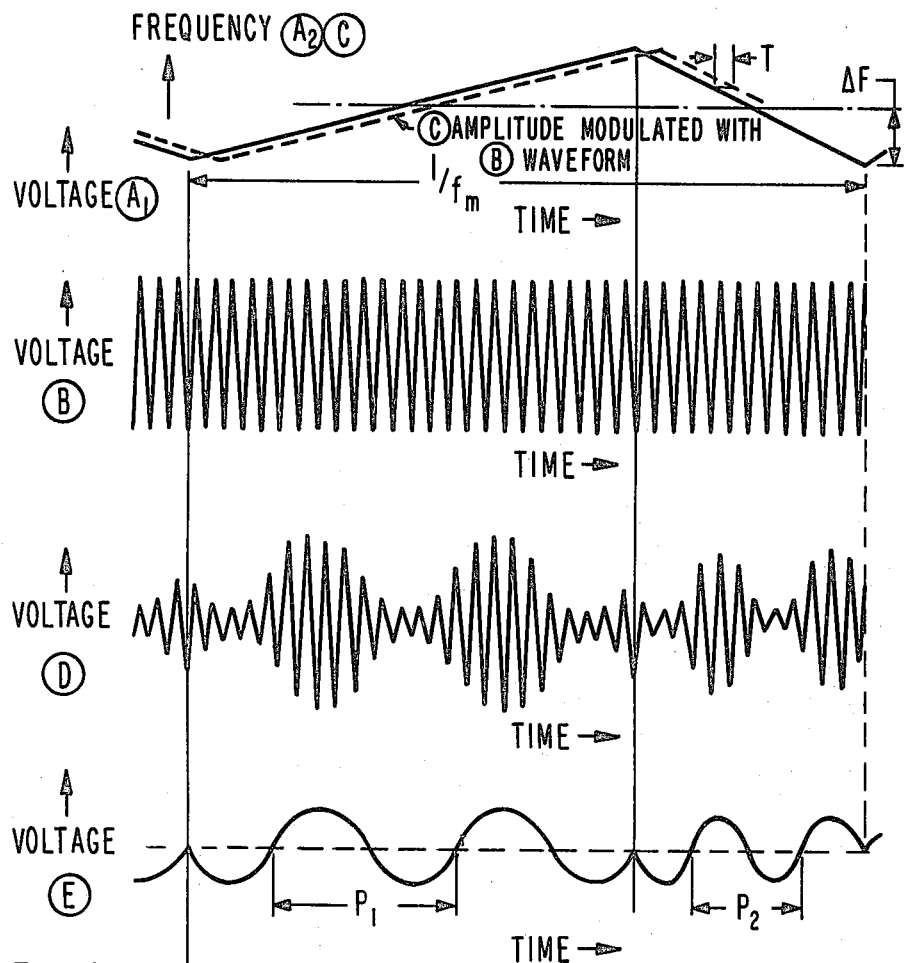
FIGS. 2 and 3 are sets of waveforms useful in understanding the operation of the interrogating station and targets of FIG. 1.
Figure 3:
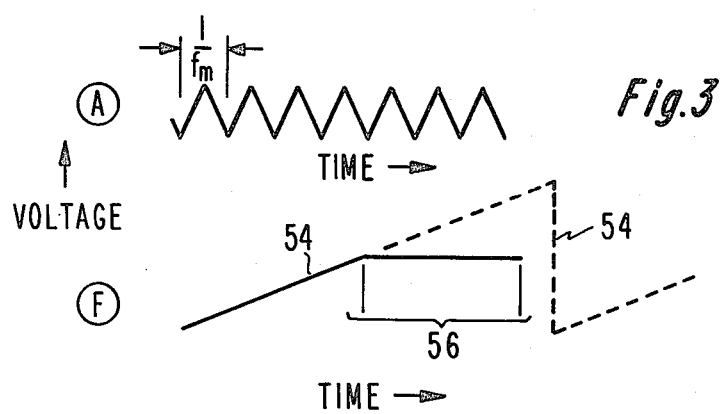

The voltage signal produced by modulating waveform generator 20 and the modulated frequency signal produced by TEO 22 and transmitted by antenna 24 as interrogating signal 30 are illustrated in FIG. 2, waveform A (hereinafter waveform 2A). The waveform denoted $A_1$, of the signal produced by generator 20 is plotted as voltage versus time. The waveform denoted $A_2$, of the signal produced at antenna 24 for transmission thereby is plotted as frequency versus time. The encircled letters, such as $A_1$ and $A_2$, at various places in FIG. 1 indicate where the equivalent letter waveforms in FIG. 2 and FIG. 3 are generated. Typically, the upswing and downswing waveform portions are identical.

The carrier frequency TEO 22, may, by way of example, by 16 GHz. The frequency excursion $\Delta F$ caused by generator 20 may be $\pm 50$ MHz and may change with a frequency $f_m$ of 100 Hz. Any of a number of different modulating waveforms such as a sawtooth or continuous wave (no modulation), may be employed in substitution for waveform 2A. However, the illustrated triangular waveform facilitates easy determination of both range and range rate in a manner known to those skilled in the art and as will be described briefly hereinafter.

In response to interrogating signals 30, reply signals such as 32a and 32b are generated by respective ones of a plurality of tagged targets such as 34a and 34b. The targets may be integral parts of a spacecraft in orbit in outerspace, the identity and range and/or range rate of which are to be determined by a space worker utilizing interrogating station 10. The tags for each of targets 34a and 34b (and others not shown) comprise, in the preferred embodiment an antenna 52 of the type described in connection with antenna 24, a reflection type voltage dependent phase or amplitude modulator, such as a circuit 54, containing a varactor diode, and a tone generator such as 56, and 57. Tone generators 56 and 57 suitably generate waveforms such as waveform 2B having a frequency much greater than the frequency of the modulating signal produced by generator 20, exemplary frequencies for tone generators 56 and 57 being 100 kHz and 110 kHz respectively. The exact frequency is therefore different for each tag. Waveform 2B may be produced by a sine or squarewave oscillator constructed using any of a number of commercially available integrated circuit devices by standard methods known to one skilled in the art. Waveform 2B is illustrated at substantially less than the actual tone frequency due to practical drafting limitations. The signal produced by tone generators 56 and 57 rapidly phase or amplitude modulates the low-frequency modulated waveform received at antennas 52 and applied to reflection modulators 54.

For example, the amplitude of the tone produced by generator 56 is such as to cause modulator 54 to shift the phase of the reflected reply signal 32a, alternately, from 0° to 180° or the amplitude or reply signal 32a, from some maximum to some minimum, at a periodic rate equal to the tone frequency. The modulating waveform may be sinusoidal as shown in waveform 2B or may be a squarewave. A more detail description of a suitable tag utilizing the phase modulation technique, may be found in U.S. Pat. No. 4,003,049 issued Jan. 11, 1977, to F. Sterzer, et al.

Waveform 2C illustrates either signals 32a or 32b received from tagged target 34a or 34b, respectively, except that the further modulation provided by tone generator 56 or 57 is not illustrated due to the scale of the FIG. 2 waveforms. It will be noted that both tagged targets 34a and 34b as well as other tagged targets (not shown) the antennas of which are illuminated by signals from antenna 24, will produce waveforms 2C which waveforms are received by antenna 24. Waveform 2C is identical to waveform $2A_2$ except in three respects. First, waveform 2C is displaced by a time T from waveform $2A_2$, where T is a direct function of the range of the target, for example, 34a, which produces waveform 2C from antenna 24. Second, as above described, waveform 2C is modulated by the signal from the tone generator 56. Third, vertical displacement of waveform 2C relative to waveform 2A occurs for non-zero range rates. Reply signal 32a is routed to mixer 28 by circulator 26. Mixer 28 subtractively mixes the return waveform 2C with a sample of the transmitted waveform $2A_2$ to produce an amplitude modulated difference signal characterized by a carrier frequency equal in value to that of the tone generator in the target which is transmitting to antenna 24 and characterized by a modulation envelope frequency the value of which is indicative of range and range rate (if present). It should be noted that if two or more targets are transmitting simultaneously by antenna 24 a complex waveform will result which has carrier and envelope frequency components for each target as above described.

The signal produced by mixer 28, amplified and filtered if desired, is utilized as the output beat frequency signal of FM-CW radar 11 and is applied as noted above to target discriminator 14. Waveform 2D illustrates the signal produced by mixer 28 at terminal 12.

Target discriminator 14 comprises a broad band amplifier 40, a voltage tuned bandpass filter (BPF) 42, a threshold detector 43, an envelope detector 44 and a sweep and hold circuit 46. The output signal of radar 11 is applied to bandpass filter 42 by amplifier 40. Bandpass filter 42, in a manner to be described, is tuned to a frequency corresponding to a selected tag target. Filter 42, which can be tuned to pass any of the frequencies produced by the various tone generators such as 56 and 57, is coupled to envelope detector and low pass filter 44 and to threshold detector 43 all of conventional design. The output terminal 43a of threshold detector 43 is coupled to the control (C) terminal of sweep and hold circuit (S&H) 46. S&H 46 is, in turn, coupled to one pole 50a of single pole double throw switch 50. The switching contact 50b is coupled to the control terminal 42a of filter 42 for controlling the center frequency of the signal passed by the filter and to utilization device 18. A suitable means such as potentiometer 52 is coupled to a second pole 50c of switch 50 for providing a voltage to terminal 42a of filter 42 for setting therein a frequency of a desired tag such as 34a or 34b.

Filter 42 either passes the signal produced by mixer 28 waveform 2D or passes no signal depending on the value of signal at the filter control terminal 42a and the frequency of the signal produced by mixer 28. If the signal passed by filter 42 is above the threshold level of detector 43, its presence causes the detector 43 to produce at its output terminal 43a an appropriate logic level signal such as for example, a logic 0 which is applied to the control terminal of S&H 46. Otherwise, threshold detector 43 produces a logic 1 signal. S&H 46 is responsive to a logic 1 for producing a sweeping voltage, such as a sawtooth voltage, waveform 3F portion 54, which causes the center frequency of filter 42 to change. S&H 46 is responsive to a logic 0 signal for producing a constant value signal waveform 3F portion 56 for causing the center frequency of filter 42 to remain constant.

Waveform 2D when present is applied to envelope detector and low pass filter 44 of conventional design. The output waveform 2E of envelope detector and low pass filter 44 is applied to processor 16. Processor 16 suitably comprises means for detecting the frequency of waveform 2E and for determining therefrom the range and/or range rate of the target, the signal from which is being passed by filter 42. A suitable processor is described in U.S. Pat. No. Re. 28,302 issued Jan. 14, 1975 to H. Staras et al. and described in U.S. Pat. No. 3,968,492 issued July 6, 1976 to G. S. Kaplan. Signals determinative of range and/or range rate are passed to utilization means 18. Utilization means 18 typically includes a display for displaying either or both of range or range rate of the target from the radar antenna 24 and may also display a target number or other identification of the target whose range rate is being displayed.

The operation of the system will now be described with reference as appropriate to FIGS. 1, 2, and 3. Radar 10 transmits a continuous wave signal 30, (waveform $2A_2$) which is frequency modulated in accordance with a predetermined periodic modulation waveform. The signal is transmitted in a desired direction by the orientation of antenna 24.

Signal 30 illuminates tagged targets 34a and 34b and perhaps other targets (not shown) which respectively cause reply signals 32a and 32b to be radiated back to radar 10 in a manner previously described. The reply signals are either phase or amplitude modulated with individual tones that uniquely define the particular target. Reply signals 32a and 32b are received by radar 10 and mixed in mixer 28 with a sample of the interrogation signal (waveform $2A_2$), as derived from signal coupler 29. The output difference signal of mixer 28 is the difference between the sampled signal from coupler 29 and the reply signals from tagged targets 32a and 32b. This difference signal includes both range and identification information for targets 32a and 32b as shown for a single target in waveform 2D.

The difference signal is applied to amplifier 40 of target discriminator 16 the operation of which will now be described. As initial conditions, switch 50 is positioned as illustrative with switching contact 50b, connected to pole 50a, antenna 24 is assumed to be receiving signals from targets 34a and 34b which are set to two different modulating frequencies $F_1$ and $F_2$ of for example, 100 and 110 kHz respectively well above both the 100 Hz modulating frequency of TEO 22 and the additional modulation frequency, waveform 2E, which is indicative of range. Frequencies $F_1$ and $F_2$ are respectively produced by tone generators 56 and 57. Therefore, amplifier 40 is producing two signals similar to waveform 2D that include the $F_1$ and $F_2$ components generated by generators 56 and 57 as well as amplitude modulation components, the frequencies of which are indicative of the respective ranges. It will be further assumed that filter 42 is not tuned to either $F_1$ or $F_2$.

Therefore, filter 42 produces no signal which is above the threshold level of detector 43. Thus, detector 43 produces a logic 1 signal which causes S&H 46 to produce a sweeping voltage (waveform 3F, portion 54) which is applied to filter 42 for the purpose of changing, as a function of time, the frequency passed by filter 42. Eventually, filter 42 will be tuned to either $F_1$ to $F_2$. Assuming it becomes tuned to $F_1$, filter 42 passes the $F_1$ frequency signal the average amplitude of which is detected by detector 43 causing the detector to produce a logic 0. The logic 0 is applied to S&H 46 causing it to hold at a voltage (waveform 3F, portion 56) such that filter 42 continues to pass signals at frequency $F_1$. When filter 42 passes signals at frequency $F_1$, envelope detector and low pass filter 44 separates the high frequency $F_1$ component from the signal and passes the remaining low frequency range component, waveform 2E to processor 16.

Processor 16, in a manner well known to those skilled in the art, determines the period $P_1$ of waveform 2E during the upswing portion of the modulation waveform 2A and determines the period $P_2$ of waveform 2E during the downswing portion of the modulation waveform 2A, which periods will differ if the target is in motion relative to antenna 24. The values of $P_1$ and $P_2$ may be utilized to determine the range of target 34a from radar 10 and its range rate. For a waveform 2A with identical upswing and downswing portions $P_1+P_2$ determines range while $|P_1-P_2|$ determines range rate. For example, U.S. Pat. No. 4,003,049 issued Jan. 11, 1979 to Fred Sterzer, et al, describes the mathematics and apparatus for detecting range. U.S. Pat. No. 4,146,890 issued Mar. 27, 1979, to Richard Klensch, describes the mathematics and apparatus for detecting range rate given $P_1$ and $P_2$. Alternatively, the range may be differentiated to obtain range rate.

Processor 16 passes the range and/or range rate information to the utilization device 18 which may cause the information to be processed or utilized in a way, such as for example, to be displayed. Utilization device 18 also receives at terminal 18a a voltage corresponding to the frequency being passed by filter 42 which uniquely identifies the particular target 34a whose range and/or range rate are being determined. The target identification information may also be displayed on or otherwise utilized in utilization device 18, If for any reason a return signal is no longer received from target 34a, threshold detector 43 will produce a logic 1 and S&H 46 will resume sweeping until some target is acquired.

Thus far a mode of operation has been described in which the interrogation system locks onto, by chance, any one of the targets from which it is receiving reply information. If only one target is illuminated by signals from antenna 24, as will many times be the case, or if information from any targets is acceptable, the mode of operation above-described will be satisfactory. However, if as illustrated in FIG. 1, a plurality of targets are illuminated and it is desirable to determine the range and/or range rate of a specific target, switch 50 is positioned such that switching contact 50b is connected to pole 50c. In such a mode of operation, potentiometer 52 is preset to provide to filter 42 a voltage which corresponds to the voltage required by filter 42 to pass the frequency of the desired target. Thus, for example if one wishes to detect the range or range rate of target 34b producing modulating frequency $F_2$, one adjusts potentiometer appropriately. Then the operation of detector 14 is as previously described except that filter 42 is continuously tuned to pass frequency $F_2$ if present and otherwise to pass nothing. If frequency $F_2$ is present the range or range rate of target 34b is determined as above described.

It will be understood that the various frequencies mentioned in the above description are exemplary only and will be chosen to suit the particular application.

I claim:

1. An interrogating station for use in a system which includes a plurality of targets remote from said interrogating station for identifying one of said targets and at least one of its range and range rate, said targets having means for receiving modulated interrogtion signals from said station and, in response thereto further modulating said signals, and radiating to said interrogating station said further modulated signals, said further modulated signals having a characteristic indicia which differs from target to target, said interrogating station comprising in combination:

means for generating said modulated interrogation signals including means for generating a sample signal indicative of said interrogation signals;

means receptive of said further modulated signals and said sample signal for generating difference signals having distinguishable components indicative of signals from various ones of said targets, said distinguishable components varying from target to target;

means providing a control signal having a selectable value;

means responsive to said difference signals and to said control signal for passing only that difference signal associated with a given target determined by the value of said control signal; and means responsive to said passed difference signals for generating a signal indicative of at least one of range and range rate relative to said interrogating station of the target associated with said passed difference signal.

2. An interrogation system comprising an interrogating station and a plurality of targets remote from the station for identifying and determining at least one of the range and range rate of a selected one of said targets, said interrogation system comprising in combination:

means in said interrogating station for generating and transmitting to said targets modulated interrogation signals including means for generating a sample signal indicative of said interrogation signals;

means in said targets for receiving said interrogation signals and, in response thereto further modulating said signals, and radiating to said interrogating station said further modulated signals, said further modulated signals having a characteristic indicia which differs from target to target;

means in said interrogating station receptive of said further modulated signals and said sample signal for generating difference signals having distinguishable components indicative of signals from various ones of said targets, said distinguishable components varying from target to target;

means in said interrogating station providing a control signal having a selectable value;

means in said interrogating station responsive to said difference signals and to said control signal for passing only that difference signal associated with a given target determined by the value of said control signal; and means in said interrogating station responsive to said passed difference signals for generating a signal indicative of at least one of range and range rate relative to said interrogating station of the target associated with said passed difference signal.

3. The combination as set forth in claim 1 or 2, wherein said means for generating said modulated interrogation signals comprise means for generating a frequency modulated continuous wave signal.

4. The combination as set forth in claim 3, wherein said means for generating said modulated interrogation signal includes means for generating a signal having a relatively long period compared with the period of said further modulated signal.

5. The combination as set forth in claim 1 or 2, wherein said means for passing a difference signal is a voltage controlled bandpass filter (VCF) adjustable by means for said control signal to pass said difference signal associated with any of said targets when received by said interrogating station and to otherwise pass no signal.

6. The combination as set forth in claim 5, wherein means producing said control signal comprises a sweep and hold circuit and threshold detecting means, said threshold detecting means being responsive to any of said difference signals for producing a signal of one value and responsive to said no signal for producing a signal of another value and wherein said sweep and hold circuit is responsive to said signal of another value for producing a sweeping signal for causing said VCF to change the frequency of the signals it will pass, and wherein said sweep and hold circuit is responsive to said signal of said one value indicating a difference signal is being passed by said VCF for causing said VCF to be adjusted to the frequency of said difference signal associated with said given target.

7. The combination as set forth in claim 6, further including manual means for producing said control signal to cause said VCF to pass only that difference frequency associated with a given target.

* * * * *